Dec. 27, 1966 G. S. MACDONALD ET AL 3,295,039

DIGITAL COMPARATOR FOR SPEED CONTROL SYSTEM

Filed Jan. 22, 1964

INVENTORS.
Gerald S. Macdonald
Robert Page Burr
BY Arthur H. Swanson
ATTORNEY.

3,295,039

DIGITAL COMPARATOR FOR SPEED CONTROL SYSTEM

Gerald S. MacDonald, Sea Cliff, and Robert Page Burr, Huntington, N.Y., assignors to Honeywell Inc., a corporation of Delaware Filed Jan. 22, 1964, Ser. No. 339,376
9 Claims. (Cl. 318—314)

This invention relates to speed control apparatus. More specifically, the present invention relates to tape speed control apparatus.

An object of the present invention is to provide an improved tape speed control apparatus for producing a desired tape speed.

Another object of the present invention is to provide an improved speed control apparatus for producing and maintaining a desired speed of a moving member.

Still another object of the present invention is to provide an improved tape speed control using a digital signal coincidence sensing means.

A further object of the present invention is to provide an improved speed control for synchronizing the speed of a web member with a desired speed level using a digital signal coincidence control means.

A still further object of the present invention is to provide a digital signal coincidence speed control for producing a desired speed of a moving member while preventing variations therefrom.

Still another further object of the present invention is to provide an improved web member speed control apparatus, as set forth herein, having a simplified operation and construction.

In accomplishing these and other objects, there has been provided, in accordance with the present invention, a speed control apparatus in a tape speed control embodiment having a tone wheel driven by a capstan and motor combination. The prerecorded signals are sensed from the tone wheel and are compared by a digital logic circuit with a preset frequency signal representative of a desired tape speed. The logic circuit is selectively operated in two modes wherein a first mode is a control for the power to the capstan motor in either a full on or full off condition. The other mode is a control signal to proportion the power supplied to the capstan motor to maintain a synchronized operation between the tape speed and the frequency signal. The transition between the modes is made when the tape speed coincides with desired speed and a reestablishment of the first is automatically provided when the tape speed deviates from the desired speed to restore the desired tape speed.

A better understanding of the present invention may be had when the following detailed description is read in connection with the accompanying drawings, in which.

Figure 1:
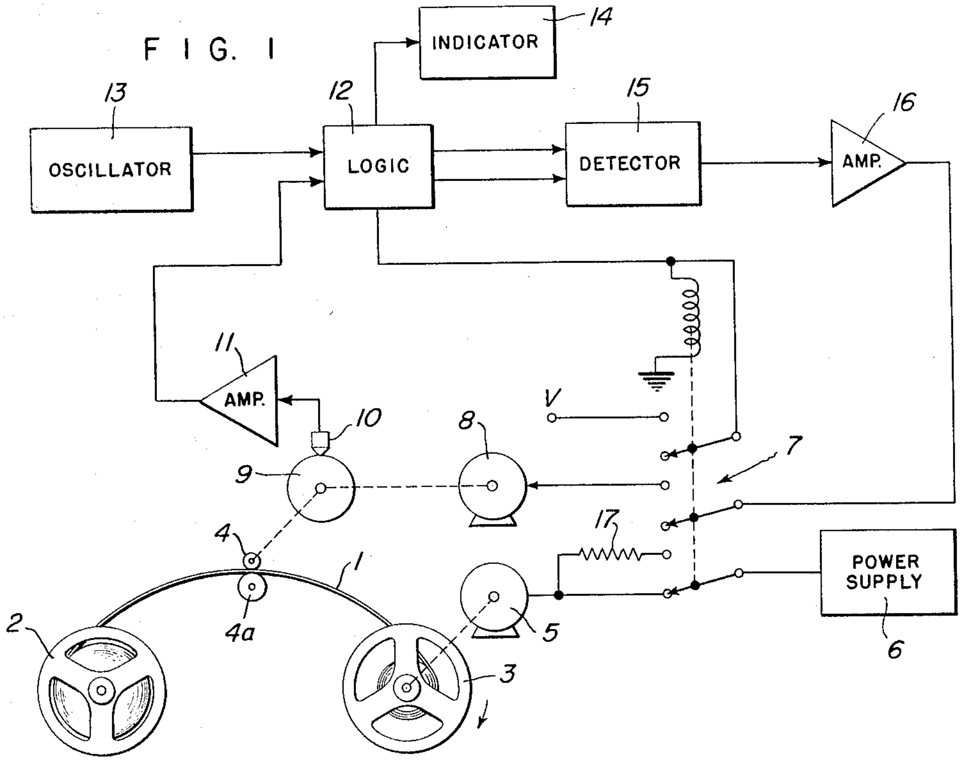
FIG. 1 is a block diagram of tape speed control system embodying the present invention.

Referring to FIG. 1 in more detail, there is shown a tape speed control system for controlling the speed of a tape 1 during its transition between a pair of storage reels 2 and 3. The tape 1 is driven by a combination of capstan 4 and pinch roller *4a*. The take-up reel 3 is driven by a reel motor 5 energized by an output signal from a power supply 6. The output signal from the supply 6 is selectively switched by a relay-operated switch 7 between a direct connection to the reel motor 5 and a current reducing resistive path 17. A capstan motor 8 is arranged to drive the capstan 4 and an operatively connected tone wheel 9. This arrangement is also effective to drive the tone wheel 9 by means of a rotation of the capstan 4 derived from the tape 1 when it is reeled upon reel 3 by reel motor 5.

A pickup head 10 is arranged to sense the prerecorded signals on the tone wheel 9. These sensed signals are amplified by an amplifier 11 and applied to a logic circuit 12, shown in FIG. 2 and described hereinafter. An oscillator 13 is provided to supply reference frequency signals to the logic circuit 12. The logic circuit 12 is arranged to operate the relay switch 7 and to provide alternate control signals to an indicator means 14 to develop an indication of the system operation; i.e., whether or not the tape speed is at the desired level. Additionally, the logic circuit 12 is arranged to supply an output signal to a signal detector 15. An output signal from the detector 15 is applied to a power amplifier 16 to energize the capstan motor 8 when the relay switch 7 is operated by the logic circuit 12. In this position of the switch 7, the power supply 6 is connected to the take-up motor 5 through a resistor 17 to reduce the power supplied to the motor 5.

In operation, the tape speed control system shown in FIG. 1 is effective to bring the tape speed up to a desired level and to, subsequently, maintain the desired level of tape speed. The desired tape speed is determined by the frequency of the output signal from the oscillator 13. The oscillator 13 may be a fixed oscillator or a variable tape speed, respectively. This frequency signal is compared by the logic circuit 12 with a frequency of the signal derived from the combination of the tone wheel 9 and the pickup head 10. The tone wheel 9 is prerecorded with evenly spaced signals. Thus, the output signal from the head 10 has a frequency which is directly proportional to the rotational speed of the tone wheel 9. The tone wheel 9 is coupled to the capstan 4 which is initially rotatively driven by the passage of the tape 1 thereacross.

The system may be started by manually operated control buttons, not shown, which are effective to turn on the control circuits, amplifiers and power supplies. In the unenergized state of relay switch 7, the power supply 6 is directly connected to the take-up motor 5 to supply a large energizing signal thereto. This signal is effective to start the operation of the motor 5, reel 3 and tape 1; i.e., the tape 1 is reeled onto the reel 3. The roller *4a* is pressed against the capstan 4 by any well-known operating mechanism to transfer the motion of the tape 1 to the capstan 4. The capstan 4 is not driven in the unenergized state of the relay switch 7 since the output signal from amplifier 16 is not connected to the capstan drive motor 8. Thus, in the initial start-up of the tape drive system, the tape 1 is accelerated by the reeling operation of the reel 3 and take-up motor 5. During this time, the capstan 4 and tone wheel 9 are increasing their speed of rotation to correspond to the translational speed of the tape 1 across the capstan 4. The speed increase is effective to increase the frequency of the signal from the pickup head 10. The signal from the head 10 is applied through amplifier 11 to logic circuit 12 to be compared with the reference frequency signal from oscillator 13.

The comparison operation of these signals by the logic circuit 12 is effective to selectively control the detector 15 and the resulting energizing operation to the capstan motor 8. An initial control operation of the logic circuit 12 is to energize the relay switch 7. The operation of switch 7 is arranged to connect the amplifier 16 to capstan motor 8 and to introduce resistor 17 between the power supply 6 and take-up motor 5. Resistor 17 is effective to reduce the power supplied to motor 5 to initiate a normal reeling operation of take-up reel 3. The capstan motor 8 is, now, controlled by the logic circuit 12 to drive the tape 1 to the desired speed. The relay switch 7 is locked into an energized state by connecting its relay coil to an energizing source "V" by an auxiliary set of contacts. The control action of the logic 12 is effected by a continuing detection of the speed relationship of the tape 1 with the desired speed in order to determine the required operation of motor 8.

Figure 2:
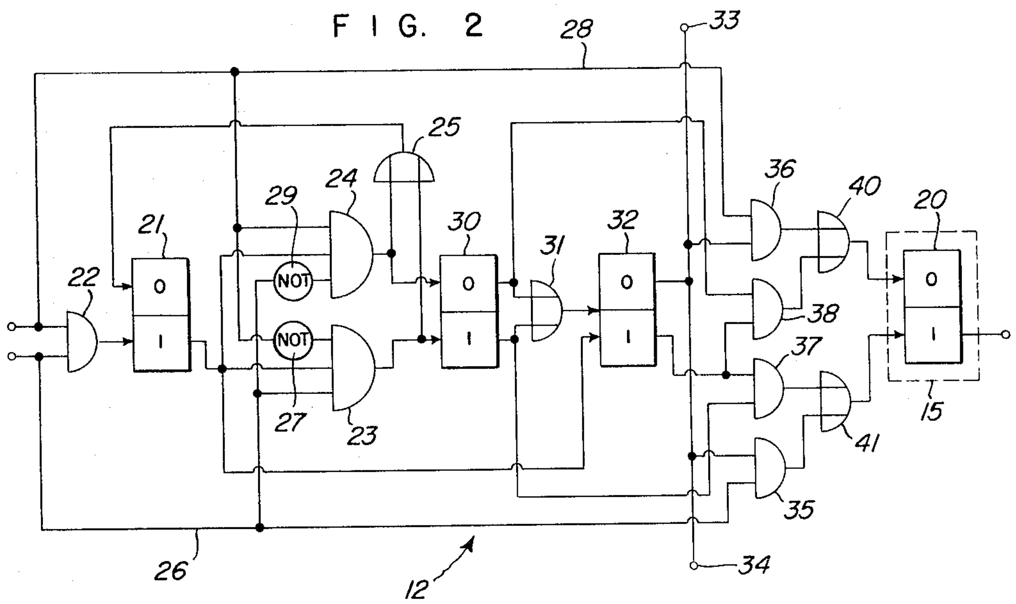
FIG. 2 is a schematic illustration of a logic circuit suitable for use with the system shown in FIG. 1.

A suitable circuit for use as the logic circuit 12 and the detector 15 is shown in FIG. 2. As shown therein, the detector 15 may comprise a binary element 20 which is triggered between its alternate states by a pair of selectively supplied input signals. The output signal from the detector 15 is taken from one side of the detector binary 15 and is applied to the power amplifier 16. Thus, the amplifier 16 is only energized when the binary 20 is in one of its alternate states.

The logic circuit 12 comprises a first logic binary element 21 arranged as a coincidence detector in combination with an AND gate 22. The two signals to be compared are applied to the AND gate 22 to be detected as either coincident or non-coincident. If the input signals have coincident pulses, the first logic binary 21 is set a "1" side and is retained in this state until reset by a resetting circuit. The resetting circuit is sensitive to either of the two input signals but not to a coincidence of the input signals. This circuit comprises a pair of AND gates 23 and 24 and an OR gate 25. Either AND gate 23 or gate 24 is arranged to produce an output signal when there is present at its input a combination of one of the input frequency pulses, a signal from the "1" side of the binary 21 and a signal indicating the absence of the other input frequency pulse. Thus, the first AND gate 23 has an input signal from the "1" side of the binary 21, an input signal from a first input line 26 repersenting the signals from tone wheel 9 and a signal from a first NOT gate 27 representing the absence of an input signal to NOT gate 27. The input signal applied to NOT gate 27 is derived from a second input line 28 representing the signal pulses from oscillator 13. Similarly, the second AND gate 24 has input signals from the "1" side of binary 21, the second input line 28 and a second NOT gate 29 representing the absence of the input signal to NOT gate 29 which is derived from the first input line 26.

The output signals from AND gate 23 and 24 are both applied to OR gate 25 to produce an output signal therefrom upon the presence of either one of them. The output signal from OR gate 25 is used to reset the first logic binary element 21 to its "0" side. Thus, the first binary element 21 will be reset each time the two input signals to the logic circuit 12 are not coincident.

A second logic binary element 30 is used to sense the output signals from AND gates 23 and 24. Specifically, the output signal from AND gate 23 is applied to second binary element 30 to set it to its "1" side. Similarly, the output signal from AND gate 24 is applied to set the binary element 30 to its "0" side. The "0" and "1" output signals from the second binary element 30 are applied in combination to an OR gate 31. Thus, the OR gate 31 is effective to produce an output signal in response to an input signal from either state of binary element 30. This output signal is coupled to a "complement" input circuit of a third logic binary element 32; i.e., each output signal from OR gate 31 will trigger the third binary 32 into an alternate state. However, the binary element 32 also has its "1" side input circuit connected to the "1" side output circuit of the first logic binary element 21. This connection is effective to apply a trigger signal to the "1" side of binary 32 when the first binary 21 switches to its "0" side.

The "0" side output signal from binary 32 is applied to two output terminals 33 and 34 for control of indicator 14 and relay switch 7. This signal is also applied to two AND gates 35 and 36. Another gate signal for each of the gates 35 and 36 is derived from the input signal lines 26 and 28, respectively.

The "1" side of binary 32 has its output signal applied to two additional AND gates 37 and 38. Another input signal for each of these gates 37 and 38 is obtained from the output signals of the "1" and "0" sides of binary element 30, respectively. The output signals from AND gates 36 and 38 are applied to a first output OR gate 40 to produce an output signal therefrom. This output signal is applied to the "0" side of the detector binary element 20. Conversely, the output signals from AND gates 35 and 37 are applied to a second OR gate 41. The output signal from OR gate 41 is applied to the "1" side of the detector binary element 20. Thus, the output signal from OR gate 41 is effective to place the binary element 20 in its "1" side which state is effective to energize the capstan motor 8 through the amplifier 16 and relay switch 7.

The operation of the detector binary 20 to its "1" side is effective to provide a control signal to the amplifier 16 in order to energize the motor 8. In discussing the phase control system of the present invention, it is essential to distinguish it from a velocity control system which operates on an error signal that is the difference between the velocity of the reference input and the velocity of the controlled variable. Thus, any corrective action taken by the control system requires a velocity error. In contrast, the phase-lock control system requires a position error signal made up of the difference between the phase of the reference oscillator and the controlled variable. In this particular case, the controlled variable may be the signal on the tone wheel 9 on the capstan 4. Since the position, or phase, control system requires no velocity error for corrective action, the velocity of the controlled variable is maintained at the velocity of the reference. A phase control system may be shown to be unstable in the absence of phase and amplitude correcting means which are effective to provide phase advance in the forward gain path of the system. Such an RC network may be provided in the amplifier 16 to convert the output signal from binary 20 to an analog DC signal and to provide the necessary phase advance for the motor control signal. In addition, it is necessary to analyze the behavior of the analog system; e.g., the inertia of the capstan motor 8 and the gain of the amplifier 16 in order to achieve stability of the overall system.

The logic circuit shown in FIG. 2 is ineffective to affect the capstan motor 8 until the relay switch 7 has been energized by a signal from the "0" side of binary element 32 while binary element 20 is energized to its "1" side. The operation of the detector binary 20 to its "1" side provides a control signal to turn the capstan motor 8 full on if the relay switch 7 is closed. Conversely, the operation of binary 20 to its "0" side is effective to turn the capstan motor full off. The operation of the logic circuit 12 is determined by the sequence of the arrival of the input signals thereto. The signal from the oscillator 13 may be designated as a "start" pulse while the signal from the tone wheel as a "stop" pulse. The logic circuit 12 is arranged to detect a coincident arrival of the pulses and to then detect the nature of the pulse which subsequently arrives.

During the time that the tape is being accelerated by the take-up motor 5, the pulses arriving from the tone wheel 9 will bear random relationships with the regular signals from the oscillator 13. There will be no output signal from AND gate 22 until there is a coincidence of these pulses. Since the "start" and "stop" pulses are randomly distributed, there will usually be a substantially immediate coincidence. This occurrence will set the binary 21 to its "1" side. The logic circuit then detects whether the next pulse is a coincident pair or the arrival of one before the other. A repetition of a coincident pulse group will not affect binary 21 which is already in its "1" side and will not pass through AND gates 23 and 24 since the input signals for these gates are not all present if both input lines 26 and 28 are simultaneously energized. Specifically, the NOT gates 27 and 29 are arranged to produce an output signal when their respective input signals are not present. If the coincident pair is followed by one of the two input signals, the AND gates 23 and 24 determine which one it is by producing an output signal corresponding to the input line which is not energized. Thus, a coincident pair followed by a "start" pulse alone will allow an output to be produced by AND gate 24 and vice versa. The output signal from AND gate 24 is effective to reset the binary element 21 to its "0" state through OR gate 25. Also, this signal is effective to set binary element 30 to its "0" side.

Binary element 30 may be designated as a speed sensor since its state is determined by whether the "start" pulse or the "stop" pulse following the coincident pair. A "stop" pulse following the coincident pair being representative of too high a speed of the capstan 4, and a "start" pulse arriving after a coincident pair representing too low a speed. Actually, during start-up, the captan 4 will always be below desired speed but the effect on the logic circuit 12 is similar to that when the logic circuit 12 is controlling the speed above the desired level, but with a different result. In other words, during a non-synchronous operation the logic circuit 12 exercises one form of control of the capstan motor which may be designated as a full-on or full-off operation. During the control at the desired speed level, or a synchronized operation, the logic circuit 12 is effective to proportion the energizing signal to the capstan motor 8 to maintain the desired speed. This control action is derived from the fact that during acceleration, the coincident pair will always be followed by a "start" pulse while during desired speed level operation, the "start" or "stop" pulse will occur alternately. This situation is used to control AND gates 35, 36, 37, and 38. Thus, when AND gates 37 and 38 are enabled by binary 32 being in a "1" state, the effect of binary 30 is directly transmitted to binary 20 to provide full power in one state or no power in the other state. When binary 32 is in its "0" side, AND gates 35 and 36 are enabled to allow the "start" or "stop" pulses to directly proportion the motor power by switching binary 20.

The output signal from both sides of binary 30 is applied through OR gate 31 to "complement" binary element 32. Thus, the binary element 32 changes state each time binary element 30 changes states. However, these changes may or may not be "in phase" with each other; e.g., a change to a "1" side for binary 30 may produce a change to a "0" side for binary 32 in an "out of phase" operation. The phase of operation is determined by the signal applied from the "1" side of binary 21 to the "1" side of binary 32. Thus, a change to a "0" side of binary 21 will change binary 32 to a "1" side if it is in a "0" side. This change in binary 21 is due to a coincident pair followed by a single pulse which does not affect binary 30 as discussed above.

Proceeding from the example above, assume a "start" pulse follows the coincident pair, this energizes AND gate 24 to place binary 30 in its "0" side and to reset binary 21 to its "0" side. Binary 32 is also triggered by binary 30 to an opposite state even though a signal also is supplied to the "1" side of binary 32. Assume this new state is a "0" side. This state energizes relay switch 7 which is locked in by the extra contacts thereon. The take-up motor 5 is now placed in a normal running condition, and the amplifier 16 is connected to capstan motor 8. The "0" side of binary 32 allows the "start" and "stop" pulses to directly control the detector binary 20. However, another coincident pair is soon detected which sets the binary 21 to its "1" side. This is followed by a "start" pulse on line 28 which does not affect binary 30 in its "0" side but does reset binary 21 to its "1" side and sets binary 32 to its "1" side. Binary 32 now opens gates 37 and 38 and terminates the "start" and "stop" from affecting binary 20. Since binary 30 is in its "0" side, this supplies a signal through gate 38 to trigger the detector 20 to its "0" side. The amplifier 16 is now energized to supply full power to the capstan motor 8. Further coincident and "start" pulse combinations have no effect since the binary 30 is retained in its "0" side, binary 32 in its "1" side and binary 20 in its "0" side. The capstan motor 8 will continue to accelerate to the desired speed level.

When the motor 8 reaches the desired speed level, the coincident pulse pair can now be followed by a "stop" pulse. This combination sets binary 21 to "0" side and back to "1" side. This action sets binary 30 to a "1" side through AND gate 23. This change in binary 30 is effective to switch binary 32 to its "0" side since the switching of binary 30 and resetting of binary 21 occur together so that binary 32 is switched in its "0" side. However, the switching of binary 32 to its "0" side is effective to open AND gates 35 and 36 to allow the "start" and "stop" pulses to directly control the motor 8 in a synchronized operation. This operation will continue as long as these pulses occur alternately and there is no coincident pair to trigger binary 21. The motor 8 is now synchronized with the speed determined by the oscillator 13. If a coincident pair should again occur due to a further change in the capstan speed, the logic circuit 12 is again triggered into operation to await the next pulse which may be either a "start" for a low capstan speed or a "stop" for a high capstan speed.

Summarizing the operation, the detector binary element 20 is triggered between its alternate sides to provide a control signal to control the power supplied to the desired level, the binary element 32 inhibits the operation of the binary 20 by the "start" and "stop" pulses and allows a system operation which is either continuously full power or no power to the motor 8. The binary element 30 and binary element 21 are used to sense a change in the relationship between the speed of the capstan motor 8 and the desired motor speed; i.e., going from a lower than desired speed to a greater than desired speed and vice versa. This change is arranged to change the state of binary element 32 to allow the "start" and "stop" pulses to control the motor 8 in a synchronized operation at the desired speed. If this synchronized operation does not occur, the logic circuit 12 is then again effective to induce full "on" or full "off" operation to return the motor 8 to the desired speed level.

Thus, it may be seen that there has been provided, in accordance with the present invention, a speed control system for bridging a moving member to a desired speed and to maintain the desired speed while preventing any variation therefrom.

What is claimed is:

1. Apparatus for detecting the speed of a moving member comprising a tone wheel having prerecorded evenly spaced signals thereon and arranged to be driven by the member, reading means operative to produce a train of signals from said tone wheel and having a frequency proportional to the rotational speed of said tone wheel, reference signal means operative to supply a predetermined frequency signal and digital coincidence comparing means arranged to compare the phase of said train of signals and said frequency signal to derive a speed indication of said moving member based on a coincidence between the compared signals and the identity of the subsequent input signal to said comparing means from the compared signals.

2. Apparatus for controlling the period of an output signal comprising a pair of input lines arranged to be connected to respective digital control signals, an AND gate operative to respond to the combination of said lines, a first binary element having one input side connected to an output signal from said gate to said element to first one of its alternate states, gating means responsive to said first one of the alternate states of said binary means and said input lines to produce an output signal to reset said element to a second one of its alternate states upon the occurrence of an energization of one input line, second binary means arranged to switch between its alternate states for each output signal from said gating means, third binary means arranged to switch between its alternate states of said second binary means and means connecting said first alternate state of said first binary means to said third binary means to place said third binary means in one of its alternate states in the absence of a change of state of said second binary means and power supply means connected to said second and said third binary means and arranged to supply an output signal having a period of occurrence controlled by the states of said second and third binary means.

3. Digital coincidence comparing apparatus comprising a pair of input signal lines, an AND gate operative to respond to the combination of said lines, a first binary element having one input side connected to an output signal from said gate to set said element to a first one of its alternate states, gating means responsive to said first one of the alternate states of said binary means and said input lines to produce an output signal to reset said element to a second one of its alternate states upon the occurrence of an energization of one input line, second binary means arranged to switch between its alternate states for each output signal from said gating means, third binary means arranged to switch between its alternate states for each switch in alternate states of said second binary means and means connecting said first alternate state of said first binary means to said third binary means to place said third binary means in one of its alternate states in the absence of a change of state of said second binary means.

4. A web member speed control apparatus comprising a web member driving means a tone wheel having prerecorded evenly spaced signals thereon and arranged to be driven by the web member, reading means operative to produce a train of signals from said tone wheel and having a frequency proportional to the rotational speed of said tone wheel, reference signal means operative to supply a predetermined frequency signal, digital coincidence comparing means arranged to compare the phase of said train of signals and said frequency signal to derive a web member speed indication based on a coincidence between the compared signals and the identity of the subsequent input signal to said comparing means from the compared signals and power supply means connected to said comparing means and arranged to supply an energizing signal to said driving means having a period of occurrence controlled by said speed indication from said comparing means.

5. A tape speed control apparatus comprising a tape driving means, a reference frequency source, a tone wheel arranged to be driven by said tape driving means, digital comparing means for comparing the phase of a signal from said source with a signal from said tone wheel to produce an indication of the relationship between the compared signals, said comparing means including a pair of input signal lines connected to the signals to be compared from said source and said tone wheel, an AND gate operative to respond to the combination of said lines, a first binary element having one input side connected to an output signal from said gate to set said element to a first one of its alternate states, gating means responsive to said first one of the alternate states of said binary means and said input lines to produce an output signal to reset said element to a second one of its alternate states upon the occurrence of an energization of one input line, second binary means arranged to switch between its alternate states for each output signal from said gating means, third binary means arranged to switch between its alternate states for each switch in alternate states of said second binary means and means connecting said first alternate state of said first binary means to said third binary means to place said third binary means in one of its alternate states in the absence of a change of state of said second binary means and power supply means connected to said second and said third binary means and arranged to supply an energizing signal to said driving means having a period of occurrence controlled by the states of said second and third binary means.

6. Apparatus for detecting the speed of a moving member comprising a means operative to produce a train of signals having a frequency proportional to the speed of said moving member, reference signal means operative to supply a predetermined frequency signal and digital coincidence comparing means arranged to compare the phase of said train of signals and said frequency signal to derive a speed indication of said moving member based on a coincidence between the compared signals and the identity of the subsequent input signal to said comparing means from the compared signals.

7. A web member speed control apparatus comprising a means operative to produce a train of signals having a frequency proportional to the speed of said web member, reference signal means operative to supply a predetermined frequency signal, digital coincidence comparing means arranged to compare the phase of said train of signals and said frequency signal to derive a web member speed indication based on a coincidence between the compared signals and the identity of the subsequent input signal to said comparing means from the compared signals and power supply means connected to said comparing means and arranged to supply an energizing signal to said driving means having a period of occurrence controlled by said speed indication from said comparing means.

8. A moving member speed control apparatus comprising a member driving means, a reference frequency source, a means operative to produce a train of signals having a frequency proportional to the speed of said member, digital comparing means operative to compare the phase of a signal from said source with a signal from said train of signals to produce an indication of the relationship between the compared signals, said comparing means including a pair of input signal lines connected to the signals to be compared from said source and said tone wheel, an AND gate operative to respond to the combination of said lines, a first binary element having one input side conected to an output signal from said gate to set said element to a first one of its alternate states, gating means responsive to said first one of the alternate states of said binary means and said input lines to produce an output signal to reset said element to a second one of its alternate states upon the occurrence of an energization of one input line, second binary means arranged to switch between its alternate states for each output signal from said gating means, third binary means arranged to switch between its alternate states for each switch in alternate states of said second binary means and means connecting said first alternate state of said first binary means to said third binary means to place said third binary means in one of its alternate states in the absence of a change of state of said second binary means and power supply means connected to said second and said third binary means and arranged to supply an energizing signal to said driving means having a period of occurrence controlled by the states of said second and third binary means.

9. Apparatus for detecting the speed of a moving member comprising a means operative to produce a train of signals having a frequency proportional to the speed of said moving member, reference signal means operative to supply a predetermined frequency signal and digital coincidence comparing means arranged to compare the phase of said train of signals and said frequency signal to derive a speed indication of said moving member based on a coincidence between the compared signals and the identity of the subsequent input signal to said comparing means from the compared signals, said comparing means including a pair of input signal lines connected, respectively, to said means operative to produce a train of signals and said reference signal means, an AND gate operative to respond to the combination of said lines, a first binary element having one input side connected to an output signal from said gate to set said element to a first one of its alternate states, gating means responsive to said first one of the alternate states of said binary means and said input lines to produce an output signal to reset said element to a second one of its alternate states upon the occurrence of an energization of one input line, second binary means arranged to switch between its alternate states for each output signal from said gating means, third binary means arranged to switch between its alternate states for each switch in alternate states of said second binary means and means connecting said first alternate state of said first binary means to said third binary means to place third binary means in one of its alternate states in the absence of a change of state of said second binary means.

References Cited by the Examiner

UNITED STATES PATENTS

| | | | |
|---|---|---|---|
| 2,932,778 | 4/1960 | Curtis | 318—314 |
| 2,999,207 | 9/1961 | Quynn | 328—48 |
| 3,182,240 | 5/1965 | Schmid | 340—146.2 X |

ORIS L. RADER, *Primary Examiner.*

MILTON O. HIRSHFIELD, *Examiner.*

G. GORDON, J. C. BERENZWEIG, *Assistant Examiners.*